(12) United States Patent
Moon et al.

(10) Patent No.: US 12,556,490 B2
(45) Date of Patent: Feb. 17, 2026

(54) DEVICE AND METHOD FOR CONTROLLING TRAFFIC TRANSMISSION/RECEPTION IN NETWORK END TERMINAL

(71) Applicant: ELECTRONICS AND TELECOMMUNICATIONS RESEARCH INSTITUTE, Daejeon (KR)

(72) Inventors: Seong Moon, Daejeon (KR); Ho Sun Yoon, Daejeon (KR); Seungwoo Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 359 days.

(21) Appl. No.: 18/220,374

(22) Filed: Jul. 11, 2023

(65) Prior Publication Data
US 2024/0106763 A1   Mar. 28, 2024

(30) Foreign Application Priority Data
Sep. 23, 2022 (KR) .................. 10-2022-0120585

(51) Int. Cl.
*H04L 47/726* (2022.01)
(52) U.S. Cl.
CPC .................. *H04L 47/726* (2013.01)
(58) Field of Classification Search
CPC ... H04L 47/726; H04L 47/82; H04L 43/0888; H04L 47/18; H04L 47/52; H04L 47/72;
(Continued)

(56) References Cited

U.S. PATENT DOCUMENTS 7,257,636 B2   8/2007 Lee et al.
8,441,916 B2   5/2013 Shin et al.
(Continued)

FOREIGN PATENT DOCUMENTS

KR   10-2217114 B1   2/2021
KR   10-2427067 B1   7/2022

OTHER PUBLICATIONS

Yin-Goo Yim et al., "Network and CPU Resource Management to Guarantee Network I/O Bandwidth in Linux", KIISE Transactions on Computing Practices, vol. 24, No. 12, pp. 687-692, Dec. 2018.

*Primary Examiner* — Jung H Park
(74) *Attorney, Agent, or Firm* — LRK PATENT LAW FIRM

(57) ABSTRACT

A device and method for controlling traffic transmission/reception in a network end terminal is provided. The method includes measuring a transmission/reception processing performance value of a first network stack and a transmission/reception processing performance value of a second network stack according to each central processing unit (CPU) core, reserving network performance required for an application on the basis of the transmission/reception processing performance value of the first network stack and the transmission/reception processing performance value of the second network stack measured according to each CPU core, and allocating a CPU core corresponding to the reserved network performance to a networking thread of the application to control traffic transmission/reception.

18 Claims, 12 Drawing Sheets

(58) Field of Classification Search
CPC ............... H04L 47/803; G06F 9/5027; G06F 2209/5018
See application file for complete search history.

(56) References Cited

U.S. PATENT DOCUMENTS

| | | | |
|---|---|---|---|
| 8,644,144 B2 | 2/2014 | Wang et al. | |
| 2004/0243723 A1* | 12/2004 | Davis | H04L 69/161 709/250 |
| 2018/0336065 A1* | 11/2018 | Martin | G06F 9/5038 |
| 2023/0066013 A1* | 3/2023 | Ball | G06F 21/606 |
| 2023/0236906 A1* | 7/2023 | Awai | G06F 21/52 719/328 |

\* cited by examiner

```
401
sfd = socket (PF_XDP, SOCK_RAW, 0) ;
buffs = calloc (num_buffs, FRAME_SIZE) ;
setsockopt (sfd, SOL_XDP, XDP_MEM_REG, buffs) ;
setsocktop (sfd, SOL_XDP, XDP_{RX | TX | FILL COMPLETION}_RING, ring_size);
mmap(, sfd, ); / map kernel rings */
bind(sfd, "/dev/eth0", queue_id, ) ;
for (;;) {
    send messages_and_receive_messages (sid);
}
```

FIG. 5

| Traffic Control | Description |
|---|---|
| Receive Packet Steering(RPS) | Use the n-tuple hash for core selection. |
| Receive Flow Steering(RFS) | Find the core that the application is running on. |
| Receive Side Steering(RSS) | Hardware version of RPS supported by NICs. |
| accelerated RFS(aRFS) | Hardware version of RFS supported by NICs. |
| manual Steering | Hardware version of manual control supported by NICs. |

DEVICE AND METHOD FOR CONTROLLING TRAFFIC TRANSMISSION/RECEPTION IN NETWORK END TERMINAL

CROSS-REFERENCE TO RELATED APPLICATION

This application claims priority to and the benefit of Korean Patent Application No. 10-2022-0120585, filed on Sep. 23, 2022, the disclosure of which is incorporated herein by reference in its entirety.

BACKGROUND

1. Field of the Invention

The present disclosure relates to a technology for controlling traffic transmission/reception in a network end terminal, and more particularly, to a device and method for controlling traffic transmission/reception to ensure traffic transmission/reception performance required for an application in a network end terminal.

2. Description of Related Art

With the appearance of new services, such as video conferences, remote control, virtual reality, metaverse, holograms, etc., applications continuously require a wider network bandwidth and a shorter delay for network traffic. Also, these requirements of a bandwidth and delay should be ensured at a certain performance level when the services are provided.

Considerable efforts are currently being made to satisfy these requirements for applications in end-to-end network sections. However, these efforts mainly use methodologies in terms of network protocols. Network protocols mainly try to achieve purposes such as preventing packet loss, ensuring a transmission order, ensuring a bandwidth, ensuring a delay, etc., while operating at one end and the other end. Network protocols operate to ensure performance in network sections but do not take traffic performance in end terminals into consideration.

However, traffic of several services may be mixed in an end terminal, and resources for processing traffic in the terminal, such as a central processing unit (CPU), a network device, etc., are limited. When traffic of several services is mixed in a terminal having limited resources as described above, network performance required for each of the services should be ensured to perfectly guarantee the overall performance of services perceived.

SUMMARY OF THE INVENTION

The present disclosure is directed to providing a device and method for controlling traffic transmission/reception to ensure traffic transmission/reception performance required for an application in a network end terminal.

Technical objectives to be achieved by the present disclosure are not limited to that described above, and other technical objectives which have not been described will be clearly understood from the following description by those skilled in the technical field to which the present disclosure pertains.

According to an aspect of the present disclosure, there is provided a method of controlling traffic transmission/reception in a network end terminal, the method including measuring a transmission/reception processing performance value of a first network stack and a transmission/reception processing performance value of a second network stack according to each central processing unit (CPU) core, reserving network performance required for an application on the basis of the transmission/reception processing performance value of the first network stack and the transmission/reception processing performance value of the second network stack measured according to each CPU core, and allocating a CPU core corresponding to the reserved network performance to a networking thread of the application to control traffic transmission/reception.

The first network stack may include an address family Internet (AF_INET) network stack, and the second network stack may include an address family express data path (AF_XDP) network stack.

The control of the traffic transmission/reception may include allocating the CPU core corresponding to the reserved network performance with a scheduling policy SCHED_DEADLINE to control the traffic transmission/reception.

The measuring of the transmission/reception processing performance values may include creating a thread for measurement, performing control with a scheduling policy SCHED_DEADLINE so that 100% of a corresponding CPU core is used by the created thread, and then measuring the transmission/reception processing performance value of the first network stack and the transmission/reception processing performance value of the second network stack.

The reserving of the network performance may include calculating the amount of a CPU core (e.g. usage of a cpu core) for providing a bandwidth corresponding to the transmission/reception processing performance value of the first network stack and extracting the amount of a CPU core to be reserved with a scheduling policy SCHED_DEADLINE, and the control of the traffic transmission/reception may include allocating the extracted amount of a CPU core to the networking thread of the application with the scheduling policy SCHED_DEADLINE.

The control of the traffic transmission/reception may include, when traffic of the application is mixed with other traffic, controlling queuing of Linux traffic control (TC) to ensure a transmission bandwidth for the traffic of the application.

The reserving of the network performance may include calculating the amount of a CPU core for providing a bandwidth corresponding to the transmission/reception processing performance value of the second network stack and extracting the amount of a CPU core to be reserved with a scheduling policy SCHED_DEADLINE, and the control of the traffic transmission/reception may include allocating the extracted amount of a CPU core to the networking thread of the application with the scheduling policy SCHED_DEADLINE.

The second network stack may provide a processing function for layer 2 (L2), layer 3 (L3), and user datagram protocol (UDP) in the case of providing an ultra-high-speed bandwidth of a predefined speed or more.

The control of the traffic transmission/reception may include controlling steering of received traffic by transmitting the received traffic to a receive (RX) queue of the CPU core on which the networking thread of the application runs so that the received traffic is processed by the CPU core on which the networking thread of the application runs.

According to another aspect of the present disclosure, there is provided device for controlling traffic transmission/reception in a network end terminal, the device including a measurement part configured to measure a transmission/reception processing performance value of a first network stack and a transmission/reception processing performance value of a second network stack according to each CPU core, a reservation part configured to reserve network performance required for an application on the basis of the transmission/reception processing performance value of the first network stack and the transmission/reception processing performance value of the second network stack measured according to each CPU core, and a controller configured to control traffic transmission/reception by allocating a CPU core corresponding to the reserved network performance to a networking thread of the application.

The above briefly summarized features of the present disclosure are merely illustrative aspects of the detailed description of the present disclosure to be described below and do not limit the scope of the present disclosure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 5 is a table showing examples of received-traffic steering techniques;

DETAILED DESCRIPTION OF EXEMPLARY EMBODIMENTS

Figure 1:
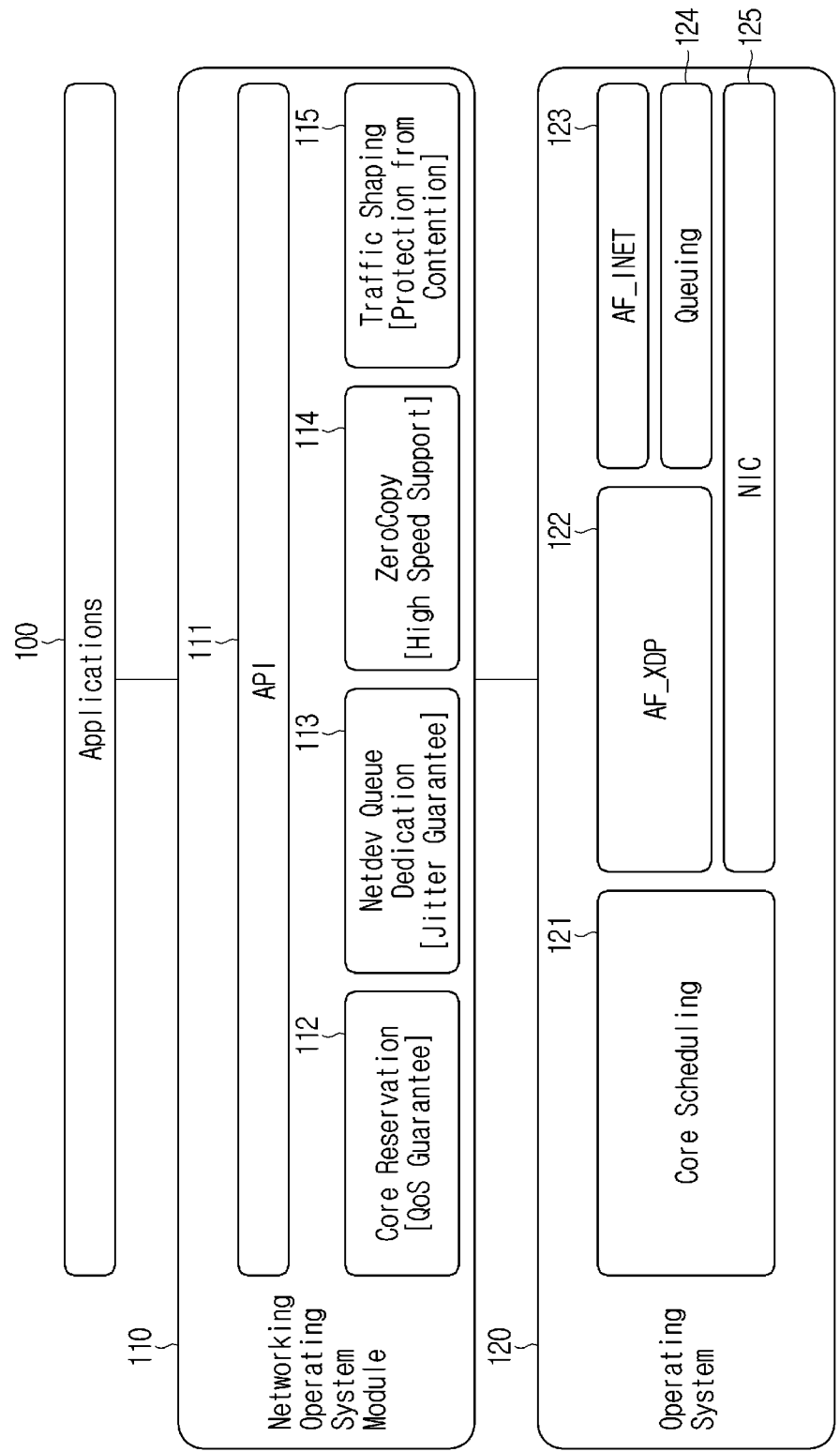
FIG. 1 is a diagram illustrating an example structure of a networking operating system (OS) module.

Hereinafter, exemplary embodiments of the present disclosure will be described in detail with reference to the accompanying drawings so that those skilled in the technical field to which the present disclosure pertains may readily implement the embodiments. However, the present disclosure may be implemented in various different forms and is not limited to the embodiments described herein.

In describing embodiments of the present disclosure, when it is determined that detailed description of well-known elements or functions may obscure the subject matter of the present disclosure, the detailed description will be omitted. In the drawings, parts unrelated to the description of the present disclosure are omitted, and like reference numerals refer to like parts.

In the present disclosure, when a component is mentioned to be "connected," "joined," or "coupled" to another component, this may mean that the component is directly connected to the other component or still another component may exist therebetween. In addition, when a component is referred to as "including" or "having" another component, the term does not preclude the presence of other components and means that other components may be additionally included unless specifically described otherwise.

In the present disclosure, the terms "first," "second," etc. are used only for the purpose of distinguishing one component from another and do not limit the order, importance, etc. of components unless specifically described. Therefore, within the scope of the present disclosure, a first component in an embodiment may be named a second component in another embodiment, and likewise, a second component in an embodiment may be named a first component in another embodiment.

In the present disclosure, components which are distinguished from each other are intended to clearly describe each feature and do not necessarily mean that the components are separate. In other words, a plurality of components may be integrated into one hardware or software unit, or one component may be subdivided into a plurality of hardware or software units. Therefore, even without specific mention, embodiments including such integrated or distributed components also fall within the scope of the present disclosure.

In the present disclosure, components described in various embodiments are not necessarily essential components, and some may be optional components. Accordingly, embodiments including a subset of components described in one embodiment are also included in the scope of the present disclosure. Also, embodiments including other elements in addition to those described in the various embodiments are also included in the scope of the present disclosure.

As used herein, expressions of positional relationships, such as up, down, left, right, etc., are for convenience of description. When drawings of the present specification are inverted, positional relationships described herein may be interpreted inversely.

As used herein, each of the phrases "A or B," "at least one of A and B," "A, B, or C," and "at least one of A, B, and C" may include any one or all possible combinations of items listed in the phrase.

Embodiments of the present disclosure are intended to control traffic transmission/reception for ensuring a bandwidth and delay which are network performance required for each application in a network end terminal, and thereby ensure network performance without jitter in a network end terminal for services requiring an ultra-high speed, a large capacity, and a short delay.

FIG. 1 is a diagram illustrating an example structure of a networking operating system (OS) module.

In general, an application program 100 uses an OS 120 to communicate with a counterpart through a network. An exemplary embodiment of the present disclosure provides a networking OS module 110 to ensure network performance in an end terminal for an application. The networking OS module 110 allows applications to use services provided by the networking OS module 110 through an application programming interface (API) 111. Also, the networking OS module 110 provides a central processing unit (CPU) core reservation function 112 for ensuring network performance, a network device queue management function 113 for ensuring jitter of network performance, a ZeroCopy function 114 for ultra-high-speed packet transmission/reception, and a traffic shaping function 115 for ensuring network performance even in competition with other traffic. The CPU core reservation function 112 uses a scheduling function 121 provided by Linux, the network device queue management function 113 is provided through queue control by a network interface card (NIC) 125, the ZeroCopy function 114 is provided using a network stack of an address family express data path (AF_XDP) 122 of Linux OS, and the traffic shaping function 115 is provided through a queuing function 124 provided by a traffic control (TC) framework of Linux. The functions and operating methods thereof will be described in detail below.

Figure 2:
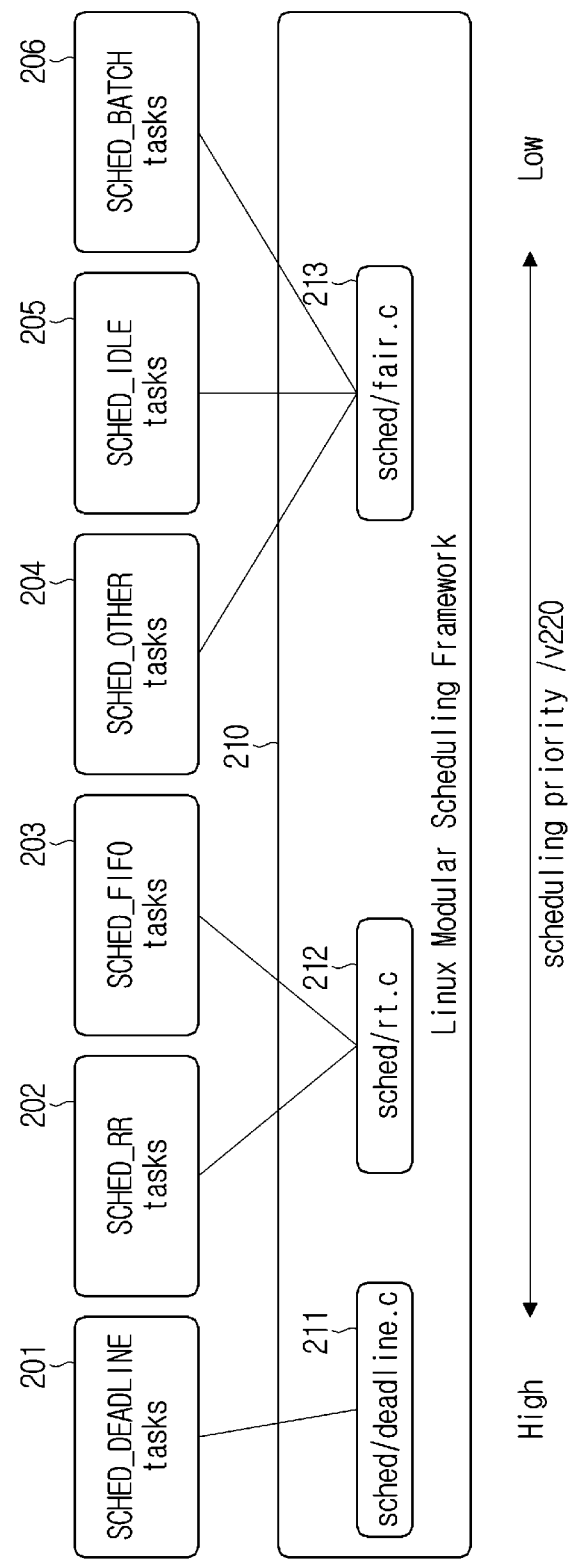
FIG. 2 is a diagram illustrating a configuration of Linux central processing unit (CPU) scheduling policies.

FIG. 2 is a diagram illustrating a configuration of Linux CPU scheduling policies.

As shown in FIG. 2, application programs which run on an OS actually operate as threads of a kernel. How many CPU resources can be used by each thread is determined according to a CPU scheduling policy of the kernel. Even when an application transmits or receives a packet, CPU resources are required to process transmit/receive (TX/RX) logic. That is, packet processing performance varies depending on how many CPU resources are allocated to a thread dealing with packet transmission/reception processing of an application. In other words, to ensure a network bandwidth and delay required for an application, it is necessary to allocate CPU resources for processing the required bandwidth within the limited time to a networking thread.

Linux provides a non-real-time policy 213, a real-time policy 212, and a deadline scheduling policy 211 (210). The non-real-time policy 213 is a policy used by applications which are insensitive to processing time and includes SCHED OTHER 204, SCHED IDLE 205, SCHED BATCH 206, etc. The real-time policy 212 is a policy assigned to applications which are sensitive to processing time and includes round robin scheduling (SCHED RR) 202 and first in first out SCHED FIFO 203. Threads running under the real-time policy 212 rather than the non-real-time policy 213 have higher priorities and thus may use CPU resources first. A policy having the highest priority is SCHED_DEADLINE 201. Threads running under this policy are ensured to have a determined runtime during a determined period. According to an exemplary embodiment of the present disclosure, the SCHED_DEADLINE policy may be used to allocate enough CPU resources to a networking thread to satisfy a network TX/RX bandwidth required for an application.

Figure 3:
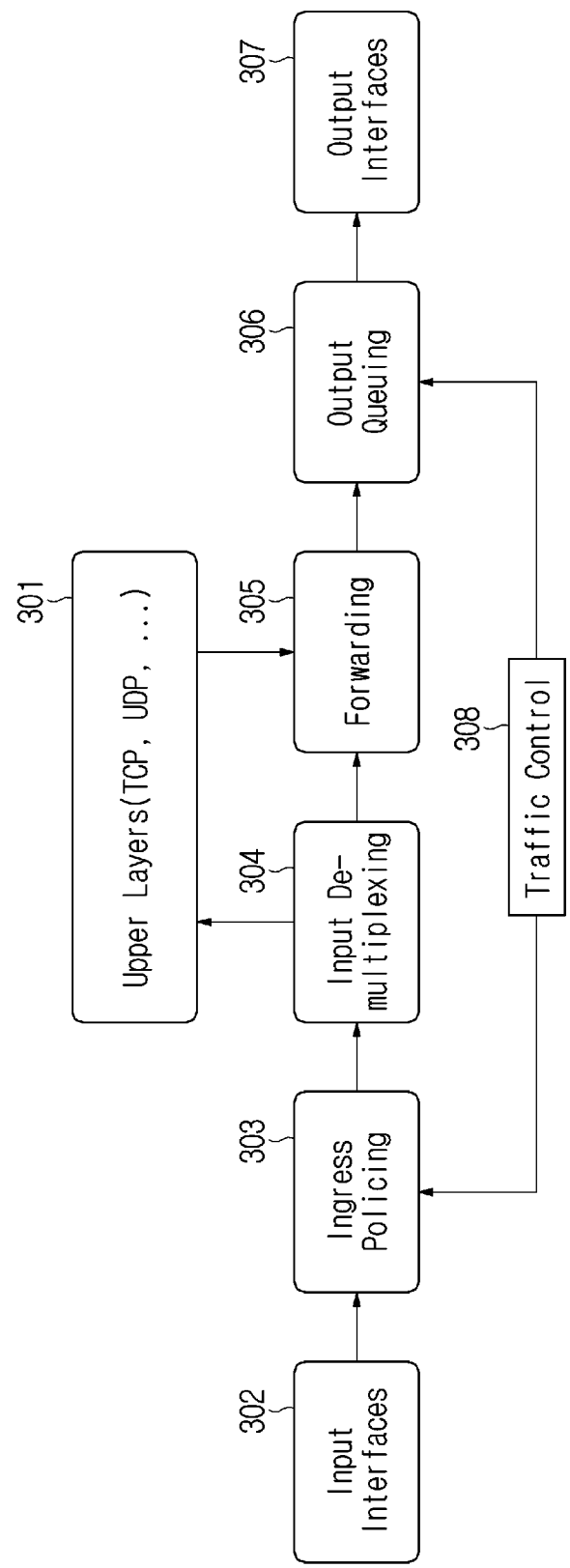
FIG. 3 is a diagram illustrating a structure of Linux traffic control (TC)

FIG. 3 is a diagram illustrating a structure of Linux TC.

As shown in FIG. 3, a network stack of Linux may provide a TC framework 308 to adjust the amount of traffic flowing thereinto or drop specific traffic or as a framework for adjusting the amount of traffic transmitted to a network or specially processing specific traffic. The amount of traffic flowing into the network stack and the like is determined through an ingress policing operation 303, and traffic flows into the network stack through an input network interface 302. Traffic flowing into the network stack is transferred to a transmission control protocol (TCP)/user datagram protocol (UDP) layer 301 which is an upper layer through a demultiplexing operation 304 when a corresponding end is a final receiver. Otherwise, the traffic is transmitted to another network through a forwarding operation 305. Traffic transmitted from the upper layer 301 is also transmitted to the network through the forwarding operation 305. Packets which are determined to be sent to an output network interface 307 in the forwarding operation 305 always pass through a queuing operation 306 of TC before being transmitted to the output network interface 307. When a packet is not sent to an output network interface in the queuing operation 306, the packet will never be externally transmitted.

When traffic sensitive to processing time and traffic insensitive to processing time are transmitted through the same output network interface, the two types of traffic equally use the network interface in general unless the queuing operation 306 of TC is controlled. For example, when an output network interface supports a transmission rate of 1 Gbps, traffic sensitive to processing time transmits packets at a speed of 500 Mbps, and traffic insensitive to processing time transmits packets at a speed of 1 Gbps, the traffic sensitive to processing time is actually transmitted at a speed of ⅓ Gbps (333 Mbps), and the traffic insensitive to processing time is actually transmitted at a speed of ⅔ Gbps (666 Mbps). In this case, it is not possible to ensure processing performance for the time-sensitive traffic.

Therefore, according to an exemplary embodiment of the present disclosure, queuing of TC is controlled according to networking bandwidth requirements for an application so that networking bandwidth requirements for sensitive traffic can be ensured even when the sensitive traffic and insensitive traffic use the same output network interface.

Figure 4:
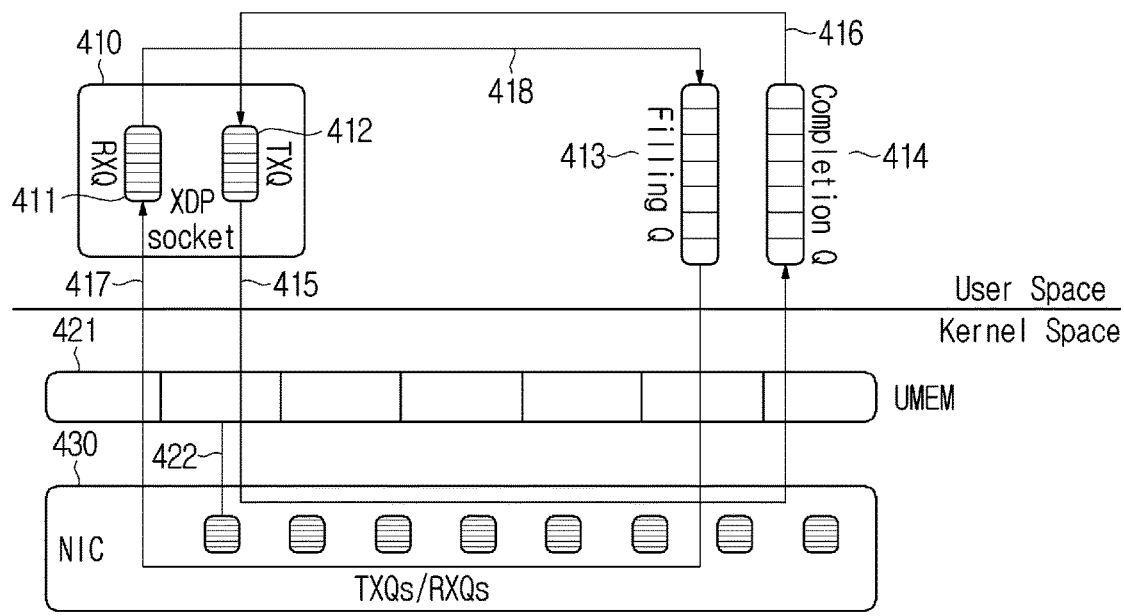
FIG. 4 is a diagram illustrating an address family express data path (AF_XDP) ZeroCopy packet transmission/reception structure.

FIG. 4 is a diagram illustrating an AF_XDP ZeroCopy packet transmission/reception structure.

Linux has several types of network stacks. One of the network stacks implementing a TCP/Internet protocol (IP) stack which is currently the most frequently used is address family Internet (AF_INET). AF_INET is a favorable network stack having a variety of functions but has one very weak point. That is packet copy overhead. All packets passing through the AF_INET stack are subjected to a packet copying process between a kernel space and a user space. For applications that require a low bandwidth, this copy overhead is not a problem, but for applications that require a very high bandwidth, this copy overhead makes it impossible to provide a bandwidth required for the applications. As described above, a network stack added to Linux for applications that require very high bandwidth processing is AF_XDP.

According to AF_XDP, no packet copying process occurs when a packet is transmitted and received between a user space and a kernel space. This is made possible by sharing a memory buffer of a user memory (UMEM) 421 between an application and the kernel. In FIG. 4, a procedure 401 is performed when an application tries to use an AF_XDP stack. First, an AF_XDP socket 410 is opened with a socket ( ) API, and a memory buffer to be used as a UMEM is allocated. The allocated memory buffer is registered in the AF_XDP stack, and TX/RX descriptor queues to be used for packet transmission/reception are registered in AF_XDP. One peculiar point is that the corresponding socket is bound to a specific queue of netdev. This is intended to ensure transmission/reception processing performance by connecting a specific (netdev, queue id) to the socket (422). When the application transmits a packet, the memory buffer of the UMEM is filled with the content of transmission data, and a TX descriptor indicating the memory is inserted into a transmit queue (TXQ) 412. Then, the AF_XDP stack transmits the data indicated by the TX descriptor in the TXQ 412 through an NIC. When the transmission is completed, the descriptor information is inserted into a completion queue 414 (415). The descriptor inserted into the completion queue 414 may be used again for transmission (416). For packet reception, an RX descriptor including information on a memory buffer in which a received packet will be stored is inserted into a filling queue 413. After that, when a packet is actually received by AF_XDP, received data is inserted into the memory indicated by the RX descriptor of the filling queue 412, and information on the RX descriptor is inserted into a receive queue (RXQ) 411 (417). Then, the application detects that there is a packet that has arrived by checking the RXQ 411 and processes the packet. Subsequently, the processed RX descriptor is inserted into the filling queue 413 again and waits for reception of another packet (418).

As described above, AF_XDP can have very high speed processing performance by removing a packet copying process but does not have a protocol processing function for TCP/IP. Therefore, according to an exemplary embodiment of the present disclosure, applications requiring an ultra-high-speed bandwidth which is not providable by AF_INET can use the AF_XDP stack to satisfy the bandwidth requirements and provide a layer 2 (L2)/layer 3 (L3)/UDP processing function required for a packet transmission/reception processing process.

Recnet NICs support multiple TX/RX queues. These NICs are generally configured to generate the same number of TX/RX queues as CPU cores that a terminal equipped with the NICs has and process interruptions occurring in each TX/RX queue by a CPU core connected to the queue.

FIG. 5 is a table showing examples of received-traffic steering techniques, illustrating methods 501 and 502 of determining which RX queue traffic received by an NIC will be sent to in order to process packet RX logic.

Receive packet steering (RPS) 503 and receive flow steering (RFS) 504 are software techniques. RPS 503 is a technique for hashing a packet on the basis of n-tuple information that the packet has, and then selecting an RX queue on the basis of the hash value. Here, n-tuples may be IP source address, UDP/TCP source port, IP destination address, and UDP/TCP destination port values. RFS 504 is a technique for processing a received packet in an RX queue connected to a CPU core on which an application that will finally use the received packet runs in cooperation with an AF_INET network stack. Receive side steering (RSS) 505 is a technique for an NIC to process n-tuple hash in terms of hardware, and accelerated RFS 506 is a technique extended so that an RX queue connected to a CPU core on which an application that will finally use a received packet runs may be selected through hardware. The most advanced scheme may be aRFS. In addition, some NICs enable a manager to manually process a specific flow in a specific RX queue, which is a manual steering technique 507.

According to received-traffic steering techniques, a CPU core on which an application that will use traffic runs processes traffic reception to increase a CPU cache hit rate so that jitter of traffic reception performance can be reduced.

The AF_INET stack has a function of sharing information on a CPU core on which an application runs with an NIC, but AF_XDP does not have such a function. Accordingly, in the case of using AF_XDP, a desired CPU core may be caused by manual steering to process received traffic. According to an exemplary embodiment of the present disclosure, received-traffic steering techniques supported by NICs are used as much as possible to ensure jitter of traffic reception performance.

According to an exemplary embodiment of the present disclosure, the scheduling policy SCHED_DEADLINE of Linux may be used to allocate CPU core resources for ensuring performance, received-traffic steering techniques of NICs may be used to ensure networking performance jitter, an AF_XDP protocol stack may be used for ultra-high-speed performance, and a queuing technique of Linux TC may be used to ensure transmission performance when different types of traffic are mixed.

A procedure in which a networking OS module processes requirements for an application to provide network performance required for the application will be described below.

Figure 6:
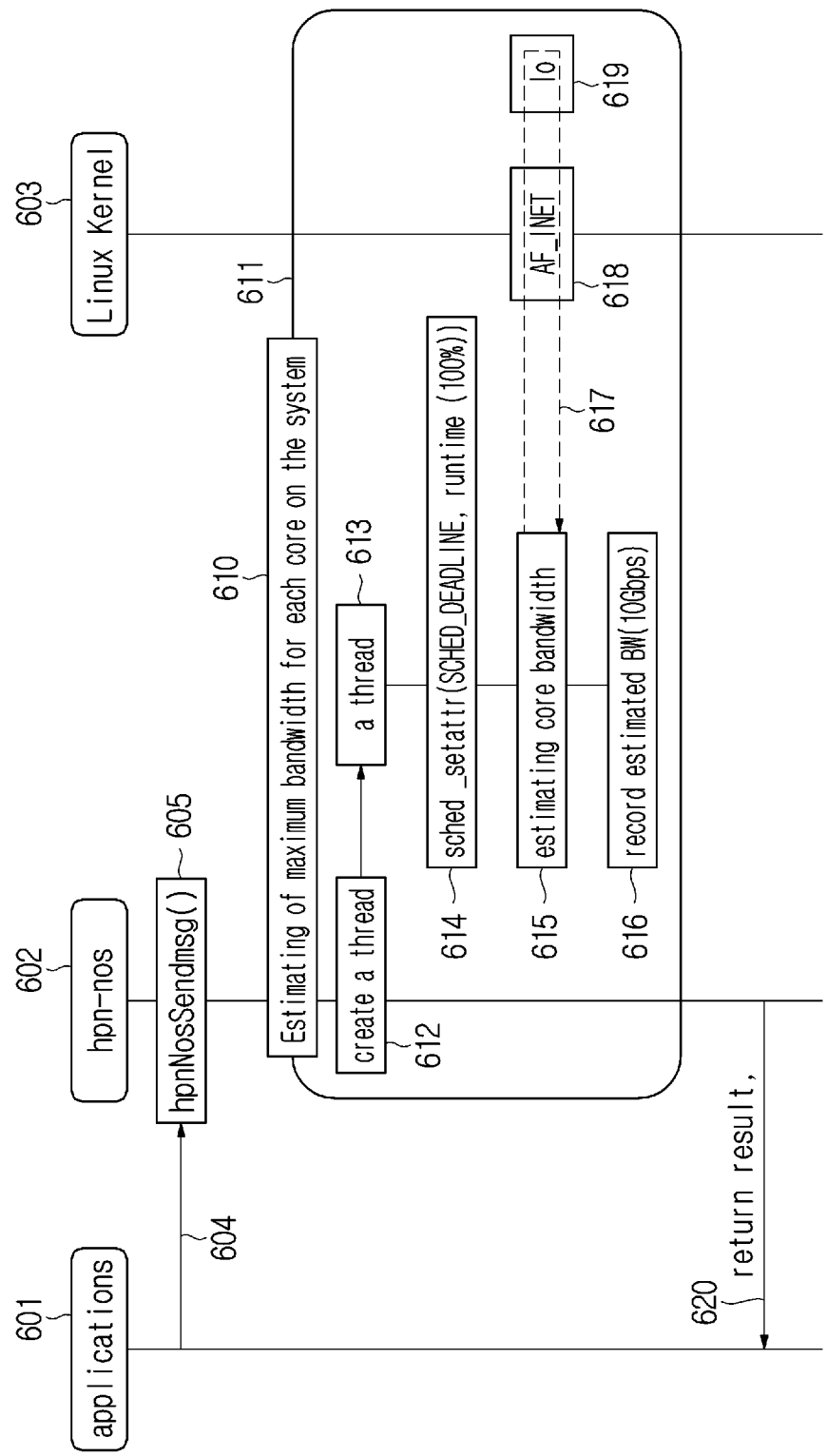
FIG. 6 is a sequence diagram illustrating a procedure for measuring traffic transmission/reception processing performance of an address family Internet (AF_INET) network stack.

FIG. 6 is a sequence diagram illustrating a procedure for measuring traffic transmission/reception processing performance of an AF_INET network stack. Here, an hpn-nos 602 may be the networking OS module 110 of FIG. 1.

The hpn-nos 602 may be manufactured in the form of a library, which may provide an API to an application 601.

At first, to use the hpn-nos library, an application calls an hpnNosInit( ) API 605 for requesting initialization. Performance of an end terminal for processing an AF_INET network stack varies depending on specifications of the terminal. Accordingly, in the case of initialization, the hpn-nos 602 measures performance of a corresponding terminal for processing the AF_INET network stack and manages the measured value. hpnNosInit( ) measures AF_INET network stack processing performance of all CPU cores that the terminal has (610 and 611). To measure the performance, a thread is created (612) and controlled to use 100% of a corresponding core according to the SCHED_DEADLINE policy (614). Subsequently, the thread 613 for performance measurement transmits traffic to a loopback (10) network interface 619 of the AF_INET 618 and then receives the traffic to measure traffic transmission/reception processing performance of the AF_INET 618 (615 and 617). Subsequently, the measured performance is recorded in an internal data structure (616). After the measurement is completed, the result is returned to the application (620). The measured AF_INET network stack transmission/reception processing performance of each CPU core is used later for reserving performance required for applications.

Figure 7:
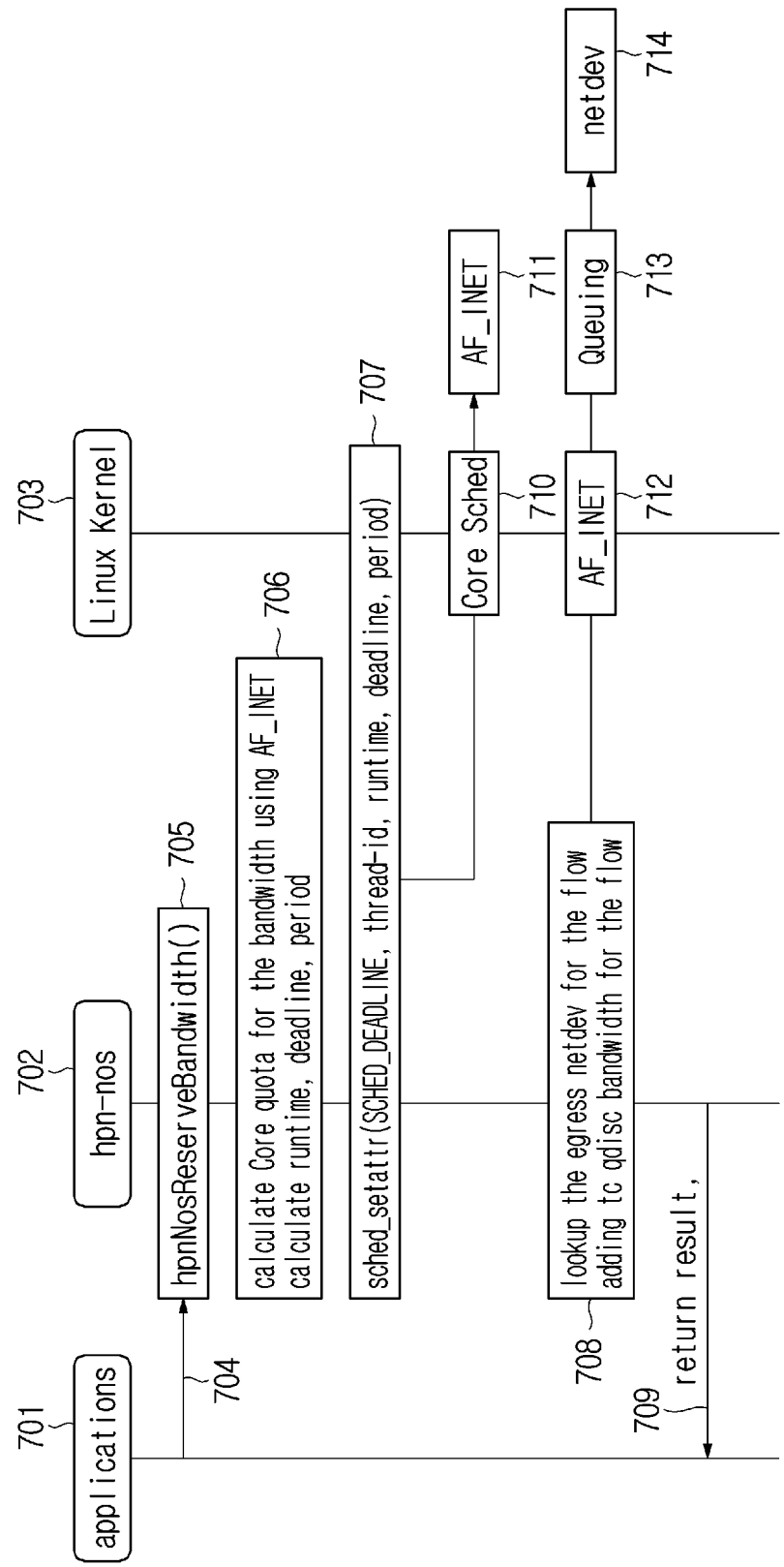
FIG. 7 is a sequence diagram illustrating a procedure for reserving AF_INET network performance.

FIG. 7 is a sequence diagram illustrating a procedure for reserving AF_INET network performance in which a networking OS module 702 reserves network performance required for an application 701 in a Linux kernel 703 on the basis of an AF_INET network stack transmission/reception processing performance value of each CPU core measured in FIG. 6.

The application 701 may use an hpnNosReserveBandwidth( ) API provided by the hpn-nos 702 (704 and 704). In this API processing logic, first, it is calculated how much CPU core is necessary to provide a network bandwidth required for the application 701, and the amount of a CPU core to be reserved through SCHED_DEADLINE is extracted (706). The extracted amount of a CPU core is allocated to a networking thread to be used by the application 701 according to the SCHED_DEADLINE policy (707). Subsequently, a bandwidth required for the networking thread may be ensured when the networking thread uses an AF_INET network stack 711 through CPU core scheduling (710).

Also, when traffic transmitted by the application 701 is mixed with other traffic, queuing 713 of Linux TC is controlled to ensure a transmission bandwidth. First, a netdev 714 for sending a flow to a network is searched for using flow information to be used by the application 701. As the flow information, a source IP address, a source TCP/UDP port, a destination IP address, a destination TCP/UDP port, an IP protocol, etc. may be used, and information on the netdev 714 for transmitting traffic sent by the application 701 may be acquired through forwarding information base (FIB) lookup by an AF_INET stack 712. Control is performed so that the bandwidth required for the application 701 may be processed through queuing of the found netdev 714 (708). After that, a result is returned to the application 701 (709).

Figure 8:
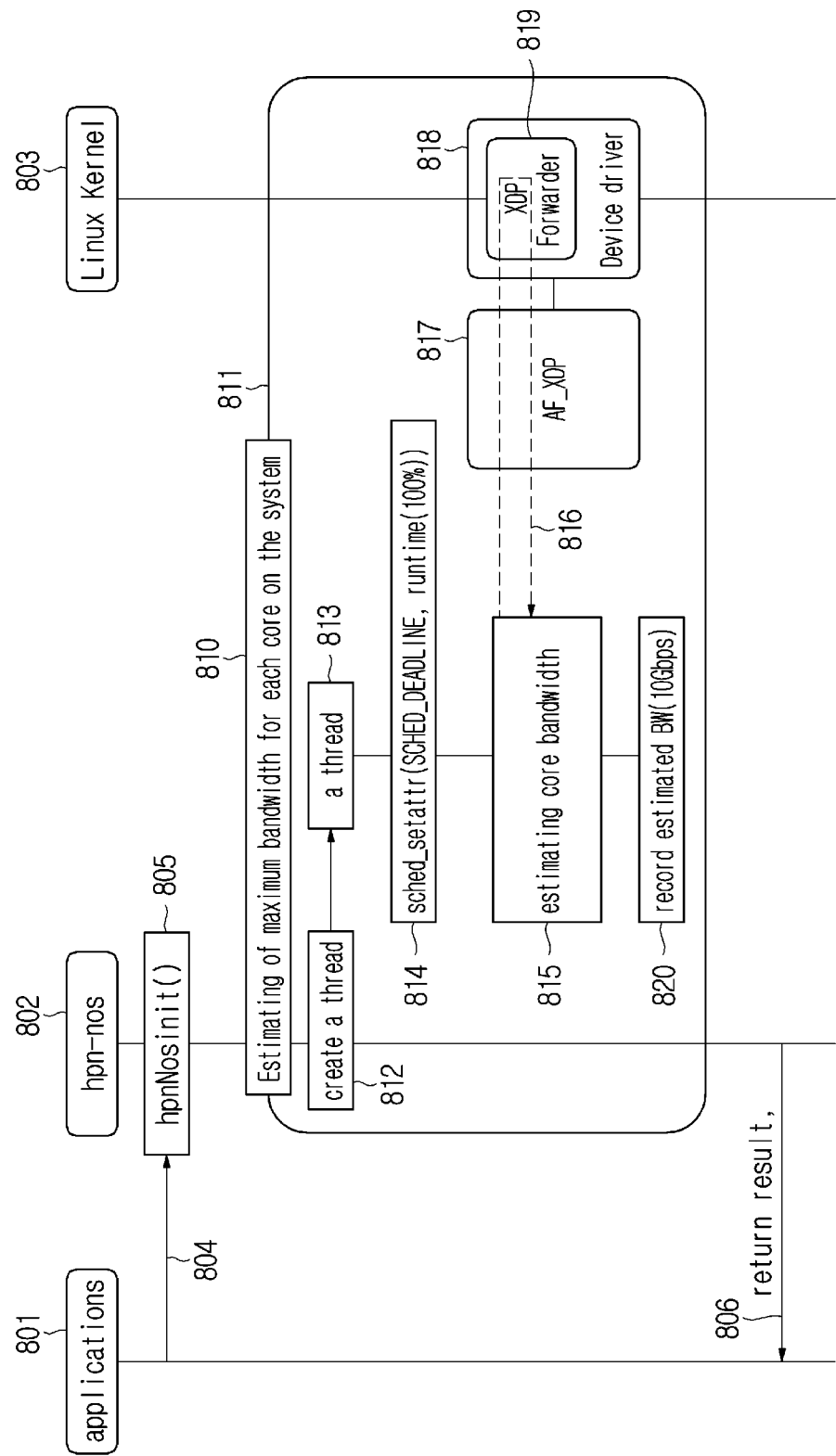
FIG. 8 is a sequence diagram illustrating a procedure for measuring processing performance of an AF_XDP network stack.

FIG. 8 is a sequence diagram illustrating a procedure for measuring processing performance of an AF_XDP network stack. Here, an hpn-nos 802 may be the networking OS module 110 of FIG. 1.

An application 801 calls an hpnNosInit( ) API (804 and 805) to request that the hpn-nos 802 perform initialization. Here, the hpn-nos 802 measures AF_XDP network stack processing performance of all CPU cores that an application has (810 and 811).

First, a thread for performance measurement is created (812 and 813), and the thread is allowed to use 100% of each CPU core (814). Subsequently, traffic is transmitted to an XDP forwarder 819 interoperating with an AF_XDP stack 817 and received (816), and then AF_XDP stack traffic transmission/reception processing performance is measured (815). Here, the XDP forwarder 819 may be separately programmed in a device driver, or a default value may be used.

The measured performance result is stored in an internal data structure (820) and returned (806). The measured AF_XDP network stack transmission/reception processing performance of each CPU core is used later for reserving performance required for applications.

Figure 9:
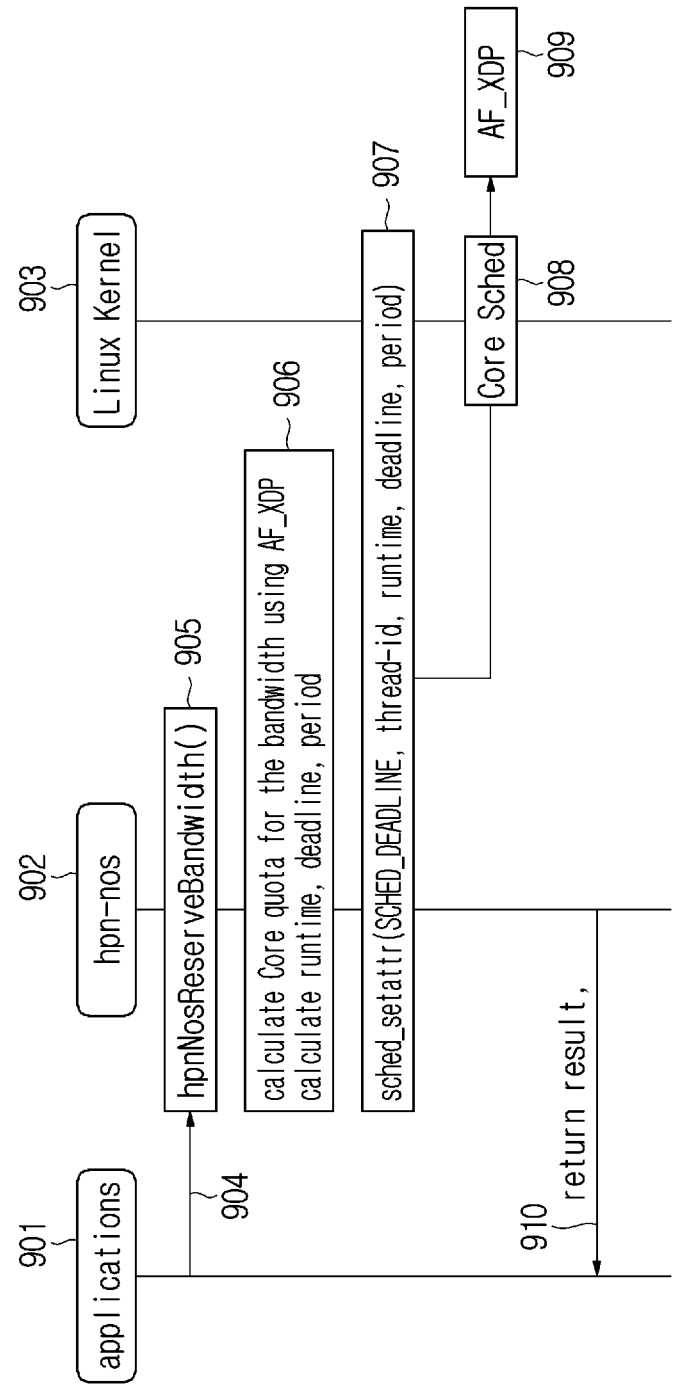
FIG. 9 is a sequence diagram illustrating a procedure for reserving AF_XDP network performance.

FIG. 9 is a sequence diagram illustrating a procedure for reserving AF_XDP network performance in which a networking OS module 902 reserves network performance required for an application 901 in a Linux kernel 903 on the basis of the AF_XDP network stack transmission/reception processing performance value of each CPU core measured in FIG. 8.

The application 901 may use an hpnNosReserveBandwidth( ) API provided by the hpn-nos 902 (904 and 904). In this API processing logic, first, it is calculated how much CPU core is necessary to provide a network bandwidth required for the application 901, and the amount of a CPU core to be reserved through SCHED_DEADLINE is extracted (906). The extracted amount of a CPU core is allocated to a networking thread to be used by the application 901 according to the SCHED_DEADLINE policy (907). Then, a bandwidth required for the networking thread may be ensured when the networking thread uses an AF_XDP network stack 909 through CPU core scheduling (908). After that, a result is returned (910).

An AF_XDP stack does not know TCP/IP. In other words, only L2 frames can be transmitted or received with an AF_XDP network stack. Therefore, in the case of providing an ultra-high-speed bandwidth using AF_XDP, an hpn-nos 1002 which is a networking OS module provides a function of processing L2, L3, UDP, etc.

Figure 10:
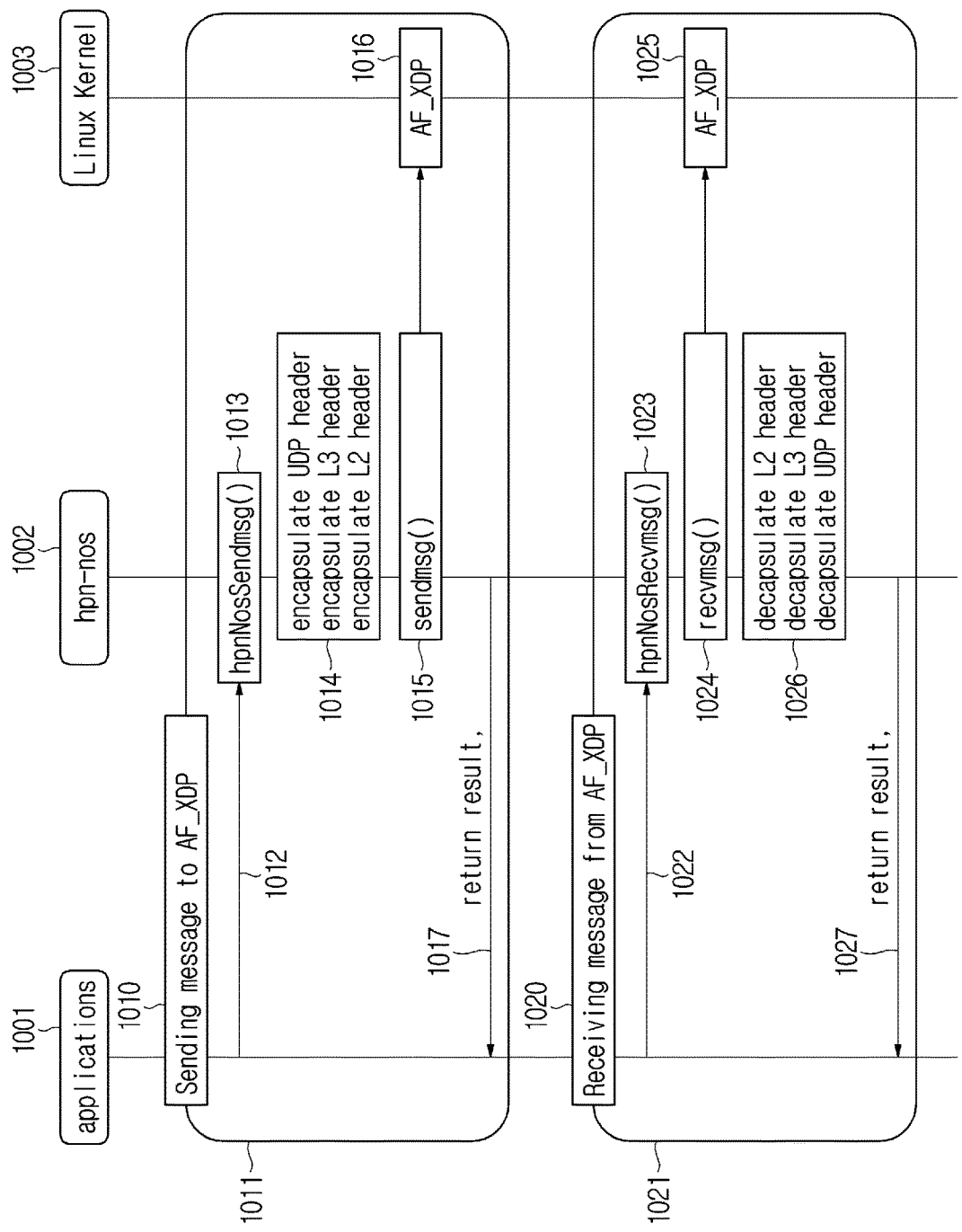
FIG. 10 is a sequence diagram illustrating a procedure for AF_XDP layer 2 (L2)/layer 3 (L3)/user datagram protocol (UDP) processing.

FIG. 10 is a sequence diagram illustrating a procedure for AF_XDP L2/L3/UDP processing which is the above procedure. First, a message transmission procedure 1010 and 1011 employing AF_XDP will be described. An application 1001 transmits a desired message thereof to the hpn-nos 1002 through hpnNosSendmsg( ) which is an API provided by the hpn-nos 1002 (1012 and 1013). Then, the hpn-nos 1002 adds UDP, L3, and L2 headers to the message (1014) and transmits an L2 frame to an AF_XDP stack using sendmsg( ) which is a TX API of the OS (1015 and 1016). After that, a result is returned (1017).

A message reception procedure 1020 and 1021 employing AF_XDP will be described. The application 1001 waits for a message to arrive at an API 1023, such as hpnNosRecvmsg( ) and the like, from a network. The hpn-nos 1002 receives the L2 frame from the AF_XDP stack (1024 and 1025).

Here, the L2, L3, and UDP headers are removed as unnecessary information (1026), and then only remaining message content may be transmitted to the application 1001 (1027).

Figure 11:
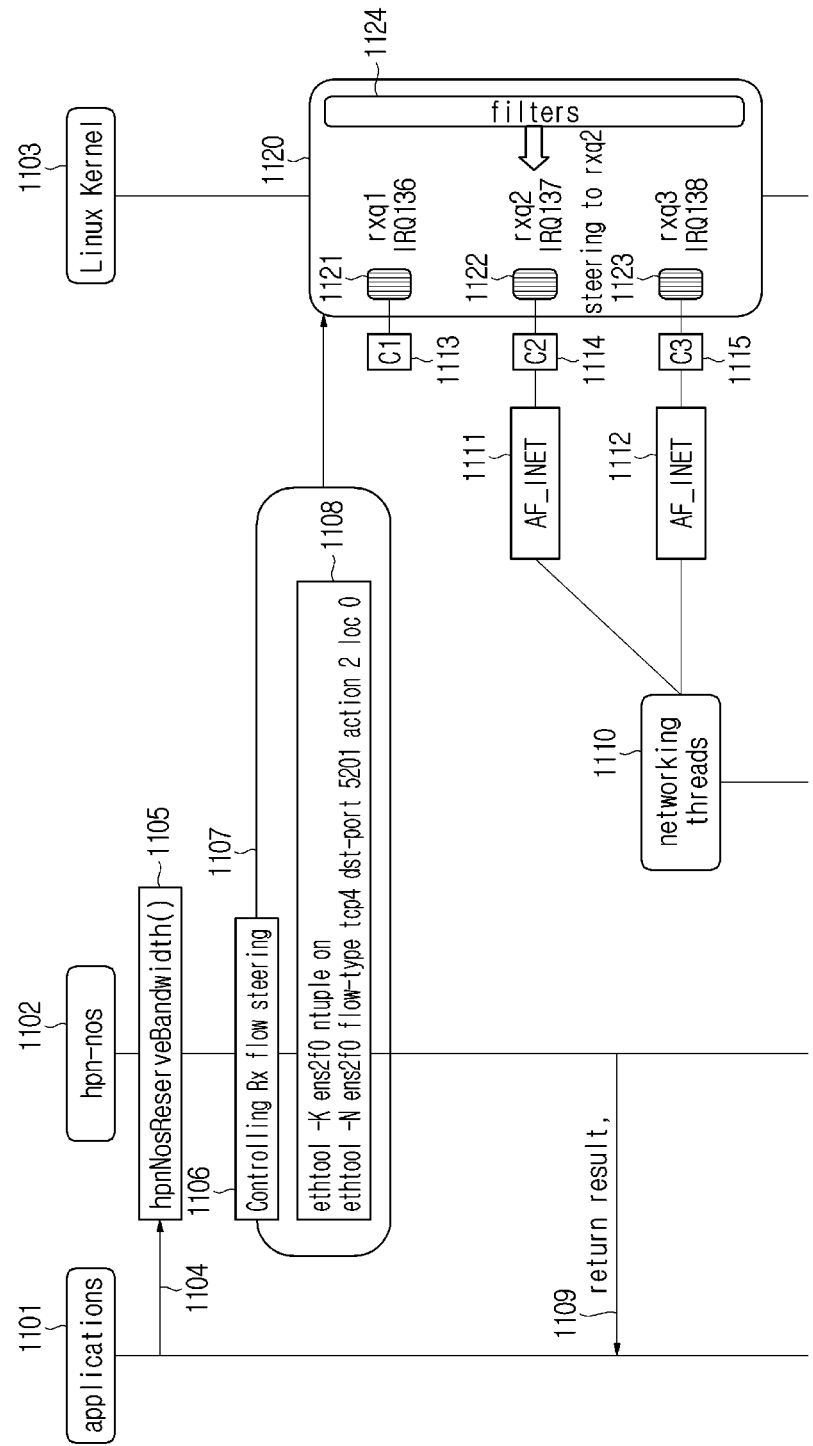
FIG. 11 is a sequence diagram illustrating a procedure for steering received traffic.

FIG. 11 is a sequence diagram illustrating a procedure for steering received traffic in which received traffic is transmitted to an RX queue connected to a CPU core on which a networking thread of an application runs.

As shown in FIG. 11, when a CPU core on which a thread that will finally use received traffic runs is caused to process the received traffic, a CPU cache hit rate is increased so that jitter of reception performance can be ensured to a certain degree. The application 1101 calls an hpnNosReserveBandwidth( ) API provided by an hpn-nos 1102 (1104 and 1105). In this case, received-traffic steering may be controlled (1106 and 1107). For example, received-traffic steering may be controlled with an ethtool command (1108). 1108 represents a case of making a setting to send traffic to RX queue No. 2 when traffic is received by an ens2f0 network interface and a destination port of TCP is 5201. This is a method available for NICs that provide manual steering. When received-traffic steering is controlled in this way, traffic corresponding to a frame received by a hardware filter 1124 of an NIC 1120 is sent to rxq2 1122. A CPU core (C2) 1114 connected to rxq2 performs packet reception processing logic on the traffic, and the traffic arrives at a networking thread 1110 which is a final destination. Such a process is performed for AF_INET and AF_XDP in the same manner.

As described above, a device and method for controlling traffic transmission/reception in a network end terminal according to embodiments of the present disclosure have the following advantages.

First, a networking thread which performs networking transmission/reception in an application is allocated a sufficient amount of CPU core for achieving network performance required for the application, and thus it is possible to ensure that there is no jitter in a bandwidth and delay required for the application over time in an end terminal.

Second, ultra-high-speed bandwidth performance which is not supported with AF_INET can be supported with AF_XDP.

Third, even when different types of traffic using AF_INET are mixed, it is possible to provide network performance required for traffic sensitive to processing time to the sensitive traffic by controlling queuing of TC.

Fourth, reception processing performance can be improved by causing a CPU core on which an application that will finally use traffic received from a network device runs to process the traffic.

According to an exemplary embodiment, a device for controlling traffic transmission/reception in a network end terminal may include functional components of a measurement part, a reservation part, and a controller. According to an exemplary embodiment, the measurement part may be a component for measuring a transmission/reception processing performance value of a first network stack and a transmission/reception processing performance value of a second network stack according to each CPU core. According to an exemplary embodiment, the reservation part may be a component for reserving network performance required for an application on the basis of the transmission/reception processing performance value of the first network stack and the transmission/reception processing performance value of the second network stack measured according to each CPU core. According to an exemplary embodiment, the controller may be a component for controlling traffic transmission/reception by allocating a CPU core corresponding to the reserved network performance to a networking thread of the application.

The first network stack may include an AF_INET network stack, and the second network stack may include an AF_XDP network stack.

According to an exemplary embodiment, the controller may allocate the CPU core corresponding to the reserved network performance with a scheduling policy SCHED_DEADLINE to control the traffic transmission/reception.

The measurement part may create a thread for measurement, perform control according to a scheduling policy SCHED_DEADLINE so that 100% of a corresponding CPU core may be used by the created thread, and then measure the transmission/reception processing performance value of the first network stack and the transmission/reception processing performance value of the second network stack.

According to an exemplary embodiment, the reservation part may calculate the amount of a CPU core for providing a bandwidth corresponding to the transmission/reception processing performance value of the first network stack and extract the amount of a CPU core to be reserved with SCHED_DEADLINE, and the controller may allocate the extracted amount of a CPU core to the networking thread of the application with the scheduling policy SCHED_DEADLINE.

According to an exemplary embodiment, when traffic of the application is mixed with other traffic, the controller may control queuing of Linux TC to ensure a transmission bandwidth for the traffic of the application.

According to an exemplary embodiment, the reservation part may calculate the amount of a CPU core for providing a bandwidth corresponding to the transmission/reception processing performance value of the second network stack and extract the amount of a CPU core to be reserved with SCHED_DEADLINE, and the controller may allocate the extracted amount of a CPU core to the networking thread of the application with the scheduling policy SCHED_DEADLINE.

According to an exemplary embodiment, in the case of providing an ultra-high-speed bandwidth of a predefined speed or more, the second network stack may provide a processing function for L2, L3, and UDP.

According to an exemplary embodiment, the controller may control steering of received traffic by transmitting the received traffic to an RX queue of the CPU core on which the networking thread of the application runs so that the received traffic is processed by the CPU core on which the networking thread of the application runs.

In addition, all functions described in FIGS. 1 to 11 may be performed by the components.

Figure 12:
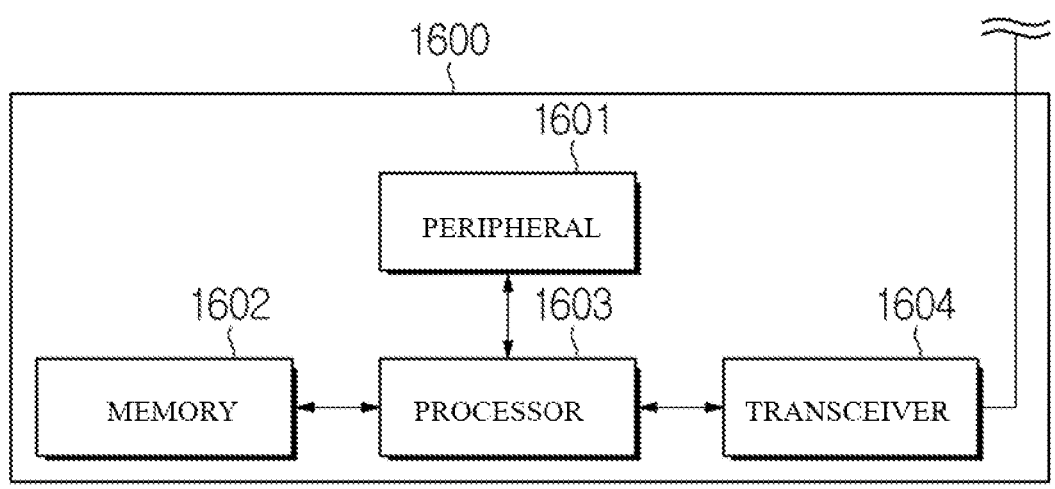
FIG. 12 is a block diagram of a device to which a traffic transmission/reception control device according to another exemplary embodiment of the present disclosure is applied.

FIG. 12 is a block diagram of a device to which a traffic transmission/reception control device according to another exemplary embodiment of the present disclosure is applied.

For example, the traffic transmission/reception control device according to the other exemplary embodiment of the present disclosure may be a device 1600 of FIG. 12. Referring to FIG. 12, the device 1600 may include a memory 1602, a processor 1603, a transceiver 1604, and a peripheral 1601. Also, the device 1600 may additionally include other components and is not limited to the above-described embodiment. For example, the device 1600 may be a mobile user terminal (e.g., a smartphone, a laptop computer, a wearable device, etc.) or a fixed management device (e.g., a server, a personal computer (PC), etc.).

More specifically, the device 1600 of FIG. 12 may be an exemplary hardware/software architecture such as a traffic control device, a network terminal, etc. For example, the memory 1602 may be a non-removable memory or a removable memory. Also, for example, the peripheral 1601 may include a display, a Global Positioning System (GPS) device, or other peripherals and is not limited thereto.

For example, the device 1600 may include a communication circuit, such as the transceiver 1604, and communicate with an external device on the basis of the communication circuit.

For example, the processor 1603 may be at least one of a general processor, a digital signal processor (DSP), a DSP core, a controller, a microcontroller, application-specific integrated circuits (ASICs), field programmable gate array (FPGA) circuits, different types of arbitrary integrated circuits (ICs), and one or more microprocessors related to a state machine. In other words, the processor 1603 may be a hardware/software component for controlling the device 1600. Also, the processor 1603 may modularize and execute the functions of the measurement part, the reservation part, and the controller described above.

To perform various necessary functions of the traffic transmission/reception control device, the processor 1603 may execute computer-executable instructions stored in the memory 1602. For example, the processor 1603 may control at least one of signal coding, data processing, power control, input/output processing, and communication operations. Also, the processor 1603 may control a physical layer, a media access control (MAC) layer, and an application layer. For example, the processor 1603 may perform an authentication and security procedure on an access layer, the application layer, etc. and is not limited thereto.

For example, the processor 1603 may communicate with other devices through the transceiver 1604. For example, the processor 1603 may control the transceiver 1604 by executing computer-executable instructions so that the transceiver 1604 communicates with other devices through a network. In other words, communication performed in the present disclosure may be controlled. For example, the transceiver 1604 may transmit a radio frequency (RF) signal through an antenna and transmit a signal on the basis of various communication networks.

For example, as an antenna technology, a multiple-input multiple-output (MIMO) technology, beamforming, etc. may be used, and the antenna technology is not limited thereto. Also, a signal transmitted or received through the transceiver 1604 may be modulated or demodulated and controlled by the processor 1603 and is not limited thereto.

According to the present disclosure, it is possible to provide a device and method for controlling traffic transmission/reception to ensure traffic transmission/reception performance required for an application in a network end terminal.

Effects of the present disclosure are not limited to that described above, and other effects which have not been described will be clearly understood from the above description by those skilled in the technical field to which the present disclosure pertains.

While the exemplary methods of the present disclosure are described as a series of operations for clarity of description, this does not limit the order in which the operations are performed. When necessary, the operations may be performed at the same time or in a different order. To implement a method according to the present disclosure, the exemplary method may additionally include other operations, include some operations while excluding other operations, or include additional other operations instead of some operations.

Various embodiments of the present disclosure are to explain the representative aspects of the present disclosure instead of describing all the possible combinations, and matters described in the various embodiments may apply independently or in combination.

Various embodiments of the present disclosure may be implemented by hardware, firmware, software, a combination thereof, etc. In the case of implementation with hardware, the embodiments may be implemented by one or more ASICs, DSPs, digital signal processing devices (DSPDs), programmable logic devices (PLDs), FPGAs, general processors, controllers, microcontrollers, microprocessors, etc.

The scope of the present disclosure includes software or machine-executable instructions (e.g., an OS, applications, firmware, programs, etc.) for executing operations of methods according to various embodiments on a device or computer and a non-transitory computer-readable medium storing such software or instructions to be executable on a device or computer.

What is claimed is:

1. A method of controlling traffic transmission/reception in a network end terminal, the method comprising:
   measuring a transmission/reception processing performance value of a first network stack and a transmission/reception processing performance value of a second network stack according to each central processing unit (CPU) core;
   reserving network performance required for an application on the basis of the transmission/reception processing performance value of the first network stack and the transmission/reception processing performance value of the second network stack measured according to each CPU core, wherein the reserving of the network performance comprises calculating an amount of a CPU core for providing a bandwidth corresponding to the transmission/reception processing performance value of the first network stack and extracting an amount of a CPU core to be reserved with a scheduling policy SCHED_DEADLINE; and
   allocating a CPU core corresponding to the reserved network performance to a networking thread of the application to control traffic transmission/reception.

2. The method of claim 1, wherein the first network stack includes an address family Internet (AF_INET) network stack, and
   the second network stack includes an address family express data path (AF_XDP) network stack.

3. The method of claim 2, wherein the second network stack provides a processing function for layer 2 (L2), layer 3 (L3), and user datagram protocol (UDP) in the case of providing an ultra-high-speed bandwidth of a predefined speed or more.

4. The method of claim 1, wherein the control of the traffic transmission/reception comprises allocating the CPU core corresponding to the reserved network performance with a scheduling policy SCHED_DEADLINE to control the traffic transmission/reception.

5. The method of claim 1, wherein the measuring of the transmission/reception processing performance values comprises creating a thread for measurement, performing control with a scheduling policy SCHED_DEADLINE so that 100% of a corresponding CPU core is used by the created thread, and then measuring the transmission/reception processing performance value of the first network stack and the transmission/reception processing performance value of the second network stack.

6. The method of claim 1, wherein
   the control of the traffic transmission/reception comprises allocating the extracted amount of a CPU core to the networking thread of the application with the scheduling policy SCHED_DEADLINE.

7. The method of claim 6, wherein the control of the traffic transmission/reception comprises, when traffic of the application is mixed with other traffic, controlling queuing of Linux traffic control (TC) to ensure a transmission bandwidth for the traffic of the application.

8. The method of claim 1, wherein the reserving of the network performance comprises calculating an amount of a CPU core for providing a bandwidth corresponding to the transmission/reception processing performance value of the second network stack and extracting an amount of a CPU core to be reserved with a scheduling policy SCHED_DEADLINE, and
   the control of the traffic transmission/reception comprises allocating the extracted amount of a CPU core to the networking thread of the application with the scheduling policy SCHED_DEADLINE.

9. The method of claim 1, wherein the control of the traffic transmission/reception comprises controlling steering of received traffic by transmitting the received traffic to a receive (RX) queue of the CPU core on which the networking thread of the application runs so that the received traffic is processed by the CPU core on which the networking thread of the application runs.

10. A device for controlling traffic transmission/reception in a network end terminal, the device comprising:
    a measurement part configured to measure a transmission/reception processing performance value of a first network stack and a transmission/reception processing performance value of a second network stack according to each central processing unit (CPU) core;
    a reservation part configured to reserve network performance required for an application on the basis of the transmission/reception processing performance value of the first network stack and the transmission/reception processing performance value of the second network stack measured according to each CPU core, wherein the reservation part calculates an amount of a CPU core for providing a bandwidth corresponding to the transmission/reception processing performance value of the first network stack and extracts an amount of a CPU core to be reserved with a scheduling policy SCHED_DEADLINE, and
    a controller configured to control traffic transmission/reception by allocating a CPU core corresponding to the reserved network performance to a networking thread of the application.

11. The device of claim 10, wherein the first network stack includes an address family Internet (AF_INET) network stack, and
    the second network stack includes an address family express data path (AF_XDP) network stack.

12. The device of claim 11, wherein the second network stack provides a processing function for layer 2 (L2), layer 3 (L3), and user datagram protocol (UDP) in the case of providing an ultra-high-speed bandwidth of a predefined speed or more.

13. The device of claim 10, wherein the controller allocates the CPU core corresponding to the reserved network performance with a scheduling policy SCHED_DEADLINE to control the traffic transmission/reception.

14. The device of claim 10, wherein the measurement part creates a thread for measurement, performs control according to a scheduling policy SCHED_DEADLINE so that 100% of a corresponding CPU core is used by the created thread, and then measures the transmission/reception processing performance value of the first network stack and the transmission/reception processing performance value of the second network stack.

15. The device of claim 10, wherein
the controller allocates the extracted amount of a CPU core to the networking thread of the application with the scheduling policy SCHED_DEADLINE.

16. The device of claim 15, wherein, when traffic of the application is mixed with other traffic, the controller controls queuing of Linux traffic control (TC) to ensure a transmission bandwidth for the traffic of the application.

17. The device of claim 10, wherein the reservation part calculates an amount of a CPU core for providing a bandwidth corresponding to the transmission/reception processing performance value of the second network stack and extracts an amount of a CPU core to be reserved with a scheduling policy SCHED_DEADLINE, and
the controller allocates the extracted amount of a CPU core to the networking thread of the application with the scheduling policy SCHED_DEADLINE.

18. The device of claim 10, wherein the controller controls steering of received traffic by transmitting the received traffic to a receive (RX) queue of the CPU core on which the networking thread of the application runs so that the received traffic is processed by the CPU core on which the networking thread of the application runs.

* * * * *